(12) United States Patent
Okada

(10) Patent No.: US 6,563,570 B1
(45) Date of Patent: May 13, 2003

(54) APPARATUS FOR EVALUATING A SAMPLE INCLUDING A SELF-SUPPORTING THIN FILM

(75) Inventor: Masashi Okada, Ibaraki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/570,161

(22) Filed: May 11, 2000

(30) Foreign Application Priority Data

May 17, 1999 (JP) ............................................ 11-135702
Jun. 14, 1999 (JP) ............................................ 11-166519

(51) Int. Cl.$^7$ ................................................ G01B 9/02

(52) U.S. Cl. ................................................ 356/35.5

(58) Field of Search ............................... 356/35.5, 496, 356/512, 73, 504; 73/37, 37.5, 150 A

(56) References Cited

U.S. PATENT DOCUMENTS 6,050,138 A * 4/2000 Lynch et al. ............... 73/150 A

FOREIGN PATENT DOCUMENTS

JP  401237430 A * 9/1989

OTHER PUBLICATIONS

Allen et al., "Microfabricated Structures for the In Situ Measurement of Residual Stress, Young's Modulus, and Ultimate Strain of Thin Films," *Appl. Phys. Lett.* 51:241–243 (1987).

Tabata et al., "Mechanical Property Measurements of Thin Films Using Load–Deflection of Composite Rectangular Membranes," *Sensors and Actuators* 20:135–141 (1989).

* cited by examiner

*Primary Examiner*—Samuel A. Turner
(74) *Attorney, Agent, or Firm*—Klarquist Sparkman LLP

(57) ABSTRACT

Apparatus are disclosed for evaluating a thin film of a sample such as a reticle blank. A representative embodiment includes a chamber defining an opening over which the sample, mounted in the sample-support mechanism, is placed such that a pneumatic pressure established in the chamber is transmitted to the thin film of the sample. A deflection-measuring device measures an amount of deflection exhibited by the thin film whenever the pressure is being applied from the chamber to the sample. An optical system irradiates the thin film of the sample, mounted to the chamber, with light to cause light reflected from the thin film to be incident on the deflection-measuring device. The sample-support mechanism includes a substrate that contacts the sample in a manner allowing access of a desired region of the thin film to the pressure, and a retainer that secures the sample and substrate to the opening in the chamber in a manner such that substrate and sample are sandwiched between the retainer and the chamber.

21 Claims, 9 Drawing Sheets

Reflected-Image System        Spread of Reflected Image
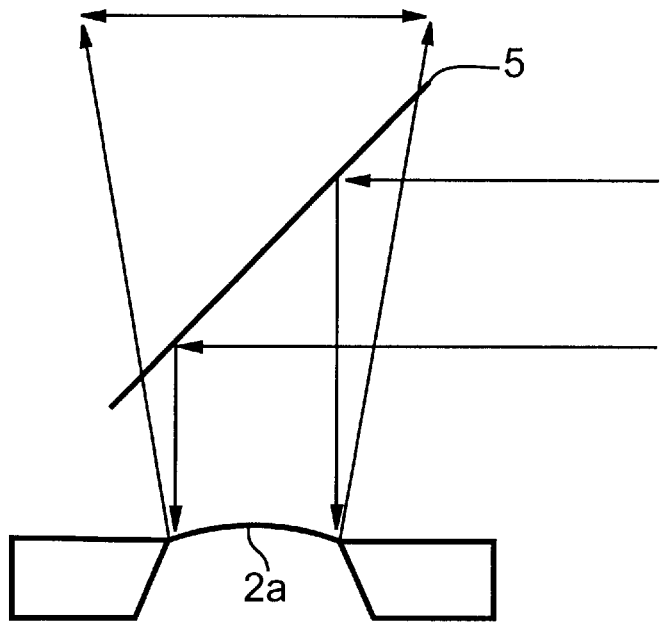
FIG. 2(a)
FIG. 2(b)
Interference System        Measure Interference Fringes
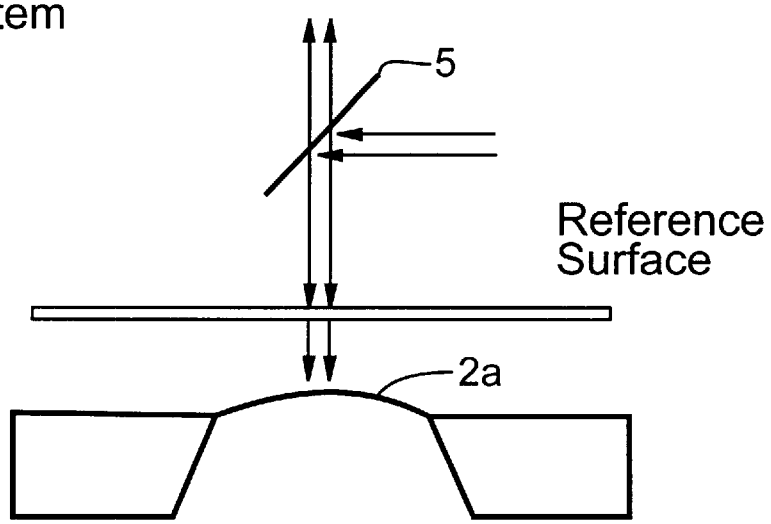

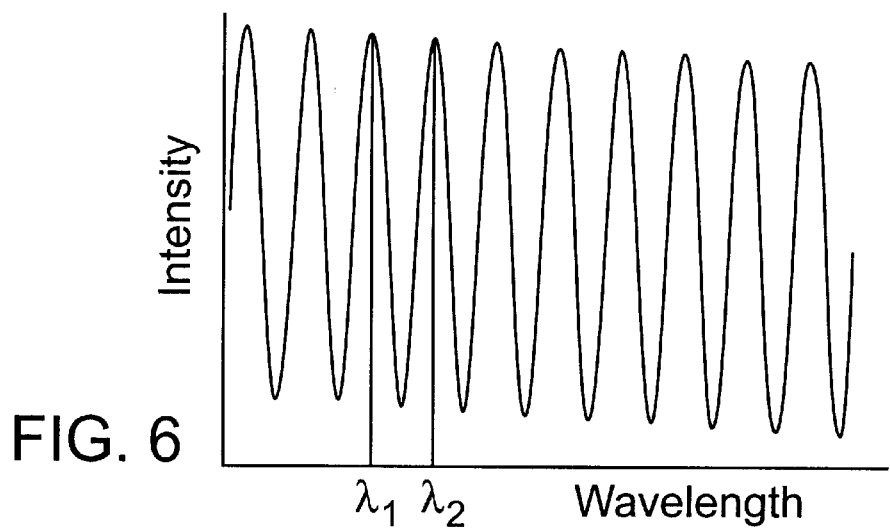
FIG. 6
FIG. 7
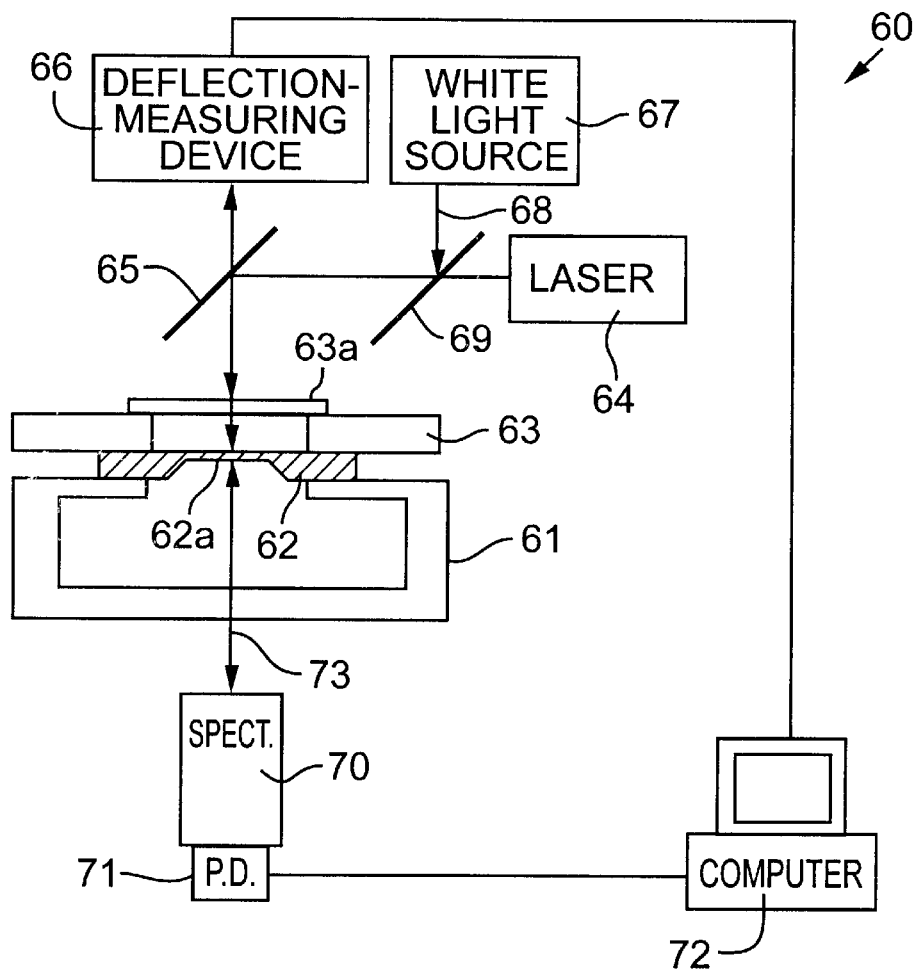

APPARATUS FOR EVALUATING A SAMPLE INCLUDING A SELF-SUPPORTING THIN FILM

FIELD OF THE INVENTION

The present invention relates to microlithography (projection-exposure) of a pattern from a reticle to a sensitive substrate using a charged particle beam such as an electron beam. Microlithography is a key technology used in the manufacture of semiconductor integrated circuits, displays, and the like. More specifically, the invention pertains to reticles for charged-particle-beam microlithography, and even more specifically to apparatus and methods for evaluating a self-supporting reticle membrane of a reticle blank, from which blank a reticle is made.

BACKGROUND OF THE INVENTION

The dramatic progressive reduction in the sizes of circuit elements in integrated circuits that has occurred in recent years has created a need for image resolution better than that obtainable using optical microlithography systems that are limited by the diffraction of light. This has led to the ongoing development of microlithography (projection-exposure) systems that, instead of using ultraviolet light, employ an X-ray beam or a charged particle beam such as electron beam or an ion beam.

Current charged-particle-beam (CPB) systems include electron-beam pattern-drawing ("direct-write") systems in which an electron beam is used to form a pattern directly (i.e., without having to project a pattern onto the wafer). Because of the current ability to stop an electron beam down to a spot diameter of a few nanometers, high-resolution sub-micron patterns can be formed in this way. A major drawback of direct-write systems is the fact that the pattern is drawn element-by-element and line-by-line (i.e., by "direct writing"). To draw a finer element, the electron beam simply is stopped down further to a smaller spot diameter. However, reducing the spot diameter increases the amount of time ("writing time") that must be expended to draw the entire pattern. Increasing the writing time correspondingly reduces throughput and increases device-production costs. Consequently, direct-write systems are impractical for mass production of chip-containing wafers.

The shortcomings of direct-write systems have motivated a large amount of development effort currently being directed to the development of a practical CPB microlithography system that projects (with demagnification) a pattern image from a "reticle" or "mask" to the wafer. Such systems are termed "reduced-image projection-exposure" CPB microlithography systems, in which a reticle defining the prescribed pattern is illuminated by a charged particle beam. (e.g., electron beam), and a reduced (demagnified) image of the pattern located within the range of illumination is transferred onto the wafer by a projection lens.

By "demagnification" is meant that the image as formed on the wafer is smaller (usually by a factor such as ¼ or ⅕) than the corresponding illuminated region on the reticle.

As noted above, the pattern is defined on a "reticle" (sometimes termed a "mask," but generally herein the term "reticle" is used). Two general types of reticles are known. A first type is termed a "scattering-membrane" reticle 21, a portion of which is shown schematically in FIG. 11(a). The scattering-membrane reticle 21 comprises a reticle membrane 22 on which regions 24 are formed. The regions 24 are of a substance that scatters particles of a charged particle beam incident from above. The reticle membrane 22 is sufficiently thin to be transmissive to particles of the incident beam and thus exhibit essentially no scattering. The regions 24, in combination with the transmissive membrane 22, define the elements of the pattern. A second type of reticle is termed a "scattering-stencil" reticle 31, a portion of which is shown schematically in FIG. 11(b). The scattering-stencil reticle 31 comprises a reticle membrane 32 (typically made of silicon) having a thickness (approximately 2 $\mu$m) sufficient to scatter particles of the incident beam. The membrane 32 defines through-holes 34 that are transmissive to particles of the incident beam. The through-holes 34, in combination with the membrane 34, define the elements of the pattern.

In CPB microlithography, it currently is impossible to project an entire pattern in one "shot." As a result, the pattern as defined on the reticle is divided or "segmented" into multiple small portions termed "subfields" 22a, 32a each defining a respective portion of the overall pattern and each containing a respective portion of the reticle membrane 22, 32. The subfields 22a, 32a are separated from one another on the reticle by boundary zones 25, 35, respectively, that do not define any portion of the pattern. Extending outwardly from the boundary zones 25, 35 are support struts 23, 33, respectively, that add substantial rigidity and strength to the reticle 21, 31, respectively.

Each subfield 22a, 32a represents an area of the reticle 21, 31, respectively, that can be exposed at any one instant, and each subfield is typically approximately 1-mm square in size. Hence, on the reticle, the entire pattern to be transferred to a chip-sized area (a "die" corresponding to a semiconductor chip) on the wafer) is divided into a large number of, typically, 1-mm square subfields. The subfields 22a, 32a are exposed individually. As the subfields are thus "transferred" to the wafer, the respective images of the subfields are "stitched" together contiguously to form the entire pattern in each die.

Reticles for CPB microlithography can be produced from a "reticle blank" which typically comprises a reticle membrane and supporting struts. One reference describing the manufacture of a reticle blank useful for making a scattering stencil reticle is Japanese Kôkai (laid-open) Patent Document No. Hei 10-106943.

More specifically, a reticle blank comprises a reticle membrane, an "outer frame" that fixes and supports the periphery of the reticle membrane, and a lattice of support struts that support the reticle membrane and divide the membrane into multiple subfields or other suitable "exposure units" (portions of the reticle that are exposed at any one instant in the CPB microlithography system).

In a reticle blank (and in a reticle made from the reticle blank), the reticle membrane is subject to certain tensile and compressive stresses. Unless stress on the reticle membrane of a reticle blank is maintained within an acceptable range, excessive strain may be manifest in the pattern subsequently defined on or in the membrane.

Hence, it is desirable to evaluate the internal stress and Young's modulus of the reticle membrane in a reticle blank. It is important, therefore, to have good techniques for performing these evaluations.

A "bulge" technique is one way in which to simultaneously measure the Young's modulus and internal stress of a membrane. Allen et al., *Appl. Phys. Lett.* 51:241–243, 1987. In a bulge technique, a pressure differential P is applied to the obverse and reverse surfaces of a membrane of a measurement sample to which a load has been applied, and any deflection (distention or bending) h of the membrane caused by the load is measured. The relationship between the applied pressure differential P and the deflection h is expressed by Equation (1) below:

$$P[r^2/(th)] = K_1\sigma + K_2[E/(1-v)](h/r)^2 \quad (1)$$

wherein σ is the membrane stress, E is the Young's modulus, v is the Poisson ratio, r is the radius (in the case of a circle) or half a length of a side (in the case of a square), t is the film thickness, and $K_1$ and $K_2$ are constants determined by the shape of the membrane.

An apparatus is shown in FIG. 10 for evaluating a sample 12 according to the principle summarized above. Tabata et al., *Sensors and Actuators* 20:135–141, 1989. The sample 12 comprises a thin-film self-supporting membrane. The FIG. 10 apparatus comprises an optical system including a He—Ne laser 14 and a beamsplitter 15. The membrane of the sample 12 to be evaluated extends across an opening defined in a pressure-adjustment chamber 11. Also included is a support mechanism 18 for the sample 12. The support mechanism 18 includes a pressure-adjustment component and pressure gauge (not shown, but see FIG. 4 of the Tabata et al. reference) and a deflection-measuring device 16 for measuring deflection of the membrane of the sample 12. The support mechanism 18 supports the sample 12 by sandwiching it between a retainer 13 and the chamber walls 11a surrounding the opening. The retainer 13 is usually affixed to the chamber 11 by screws or the like (not shown).

The FIG. 10 apparatus fixes and supports the sample 12 around the periphery of the sample (pressed between the retainer 13 and the walls 11a). The sample 12 can be a reticle blank, as summarized above, having multiple membraneous subfields separated from one another by struts. Because the struts are so narrow (each having a width of only a few hundred microns), the subfield membranes and struts tend to experience deformation whenever pressure from the retainer 13 is applied to the sample. I.e., the subfield membranes along with the struts tend to be distended ("deflected") by the applied pressure. As a result, true values of stress and Young's modulus of the subfield membranes alone cannot be obtained by this measurement technique.

Another problem with this technique is the need to have accurate data concerning the thickness of the membrane of the sample 12. Obtaining such data requires use of a separate measurement apparatus and method, which adds substantial time and complexity to the measurements.

Because of the difficulties of sample placement and data acquisition summarized above, measurements of internal stress and Young's modulus of a membrane of a reticle blank using conventional methods requires excessive time and is too complicated.

SUMMARY OF THE INVENTION

In view of the shortcomings of the prior art as summarized above, an object of the invention is to provide apparatus for evaluating a sample comprising a self-supporting thin film. One representative embodiment of such an apparatus comprises a sample-support mechanism, a chamber, a deflection-measuring device, an optical system, and a sample-support mechanism. The chamber defines an opening over which the sample, mounted in the sample-support mechanism, is placed such that a pneumatic pressure established in the chamber is transmitted to the thin film of the sample. The deflection-measuring device is situated and configured to measure an amount of deflection exhibited by the thin film whenever the pressure is being applied from the chamber to the sample. The optical system is situated and configured to irradiate the thin film of the sample, mounted to the chamber, with light and to cause light reflected from the thin film to be incident on the deflection-measuring device. The sample-support mechanism comprises a substrate configured to contact the sample in a manner allowing access of a desired region of the thin film to the pressure, and a retainer configured to secure the sample and substrate to the opening in the chamber in a manner in which the substrate and sample are sandwiched between the retainer and the chamber.

The apparatus summarized above is especially suitable for evaluating a sample that includes subfields and struts, such as a reticle blank. With such a sample, the substrate desirably is configured with channels and projecting portions situated to align with the subfields and struts, respectively.

If the sample is a reticle blank including a peripheral frame, the retainer desirably is configured to align with the peripheral frame whenever the reticle is mounted to the chamber. The optical system can comprise, for example, a laser and a mirror for directing light from the laser to the sample.

The deflection-measuring device can be configured to measure a spread of light reflected from the thin film and passing through the optical system. Alternatively, the deflection-measuring device can be configured to measure an interference of a first light reflected from the thin film with a second light reflected from a reference surface.

Another representative embodiment is especially suitable for evaluating a sample comprising a peripheral frame, struts, and a thin film extending between adjacent struts and between struts and the peripheral frame. Such an apparatus comprises a sample-support mechanism, a chamber, a deflection-measuring device, and an optical system. The chamber, deflection-measuring device, and optical system are as summarized above. The sample-support mechanism comprises a transparent substrate configured to contact the peripheral frame and struts of the sample in a manner allowing access of the thin film to the pressure. The sample-support mechanism also comprises a retainer configured to secure the sample and substrate to the opening in the chamber in a manner in which the substrate and sample are sandwiched between the retainer and the chamber.

Another representative embodiment is especially suitable for evaluating a segmented reticle blank comprising intersecting struts defining individual reticle subfields each including a respective thin film. The embodiment comprises a sample-support mechanism, chamber, deflection-measuring device, and optical system as summarized above. The sample-support mechanism comprises a substrate defining an array of holes situated so as to individually register with respective subfields of the reticle blank. The substrate is configured to contact the peripheral frame and struts of the sample in a manner allowing access of the thin film to the pressure applied through the holes. The sample-support mechanism also comprises a retainer configured to secure the sample and substrate to the opening in the chamber in a manner in which the substrate and sample are sandwiched between the retainer and the chamber.

Another representative embodiment comprises a sample-support mechanism and chamber as generally summarized above. The apparatus also comprises a deflection-measuring device situated and configured to optically measure an amount of deflection exhibited by the thin film whenever the pressure is being applied from the chamber to the sample. The apparatus desirably also comprises a computer connected to the deflection-measuring device. The computer is programmed to calculate a characteristic pertaining to one or more of internal stress and Young's modulus of the thin film.

The foregoing and additional features and advantages of the invention will be more readily apparent from the following detailed description, which proceeds with reference to the accompanying drawings.

BRIEF DESCRIPTION OF THE DRAWINGS

FIGS. 2(a)–2(b) depict two respective means for measuring membrane deflection using the apparatus of FIG. 1, wherein FIG. 2(a) depicts a reflected-image system, and FIG. 2(b) depicts an interference system.

FIG. 6 shows a reflection spectrum produced by measuring the intensity of reflection from a membrane using the apparatus of FIG. 5.

FIG. 7 is a simplified diagram of components of an apparatus for evaluating a self-supporting thin film, according to the Fourth Representative Embodiment.

DETAILED DESCRIPTION

Measurement apparatus and methods according to the invention are described below in the context of representative embodiments. However, it will be understood that the invention is not limited in any way to these specific embodiments.

First Representative Embodiment

Figure 1:
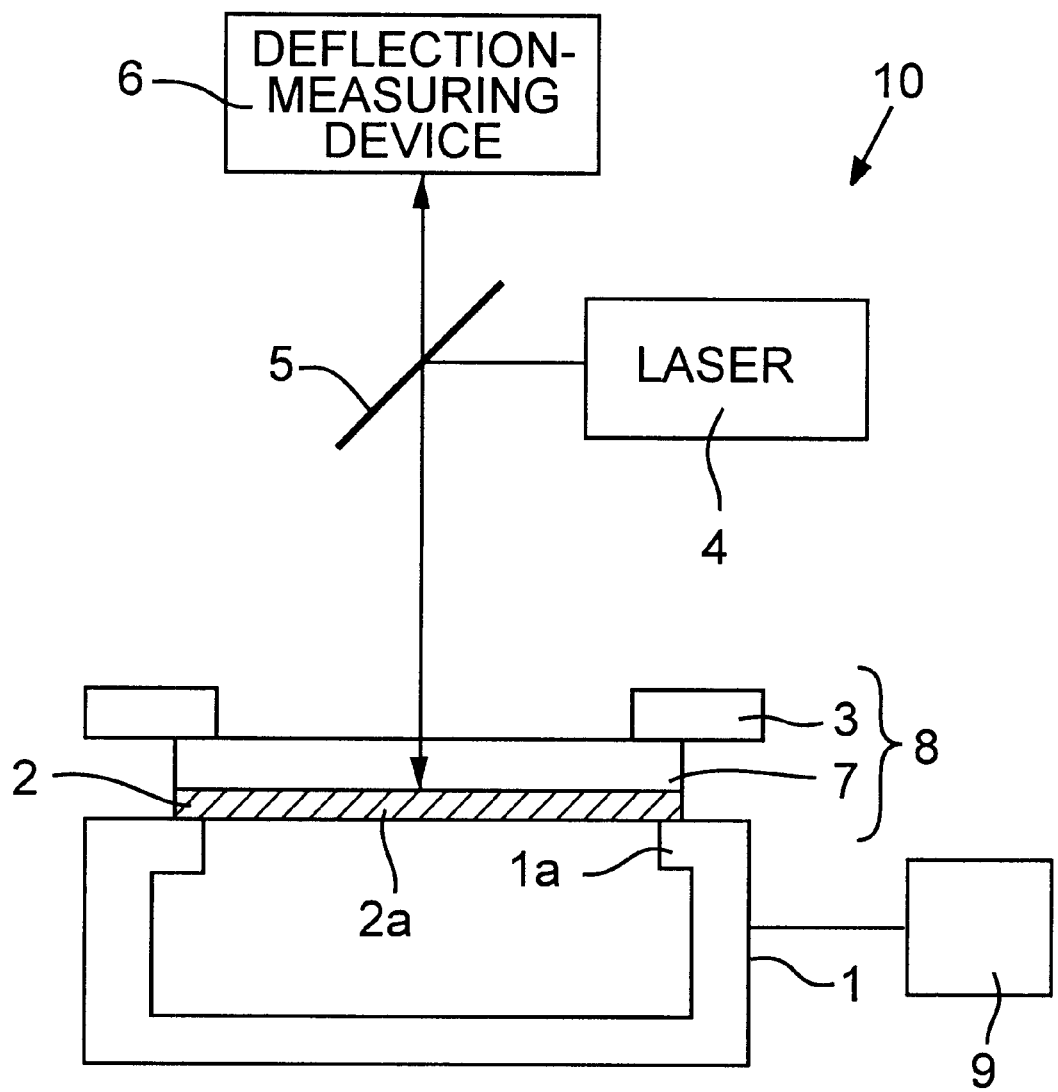
FIG. 1 is a simplified diagram of components of an apparatus for evaluating a self-supporting thin film, according to the First Representative Embodiment.

An apparatus 10 according to this embodiment for evaluating a self-supporting thin film is depicted in FIG. 1. Certain aspects of the FIG. 1 apparatus 10 are similar to the FIG. 10 apparatus.

Figure 10:
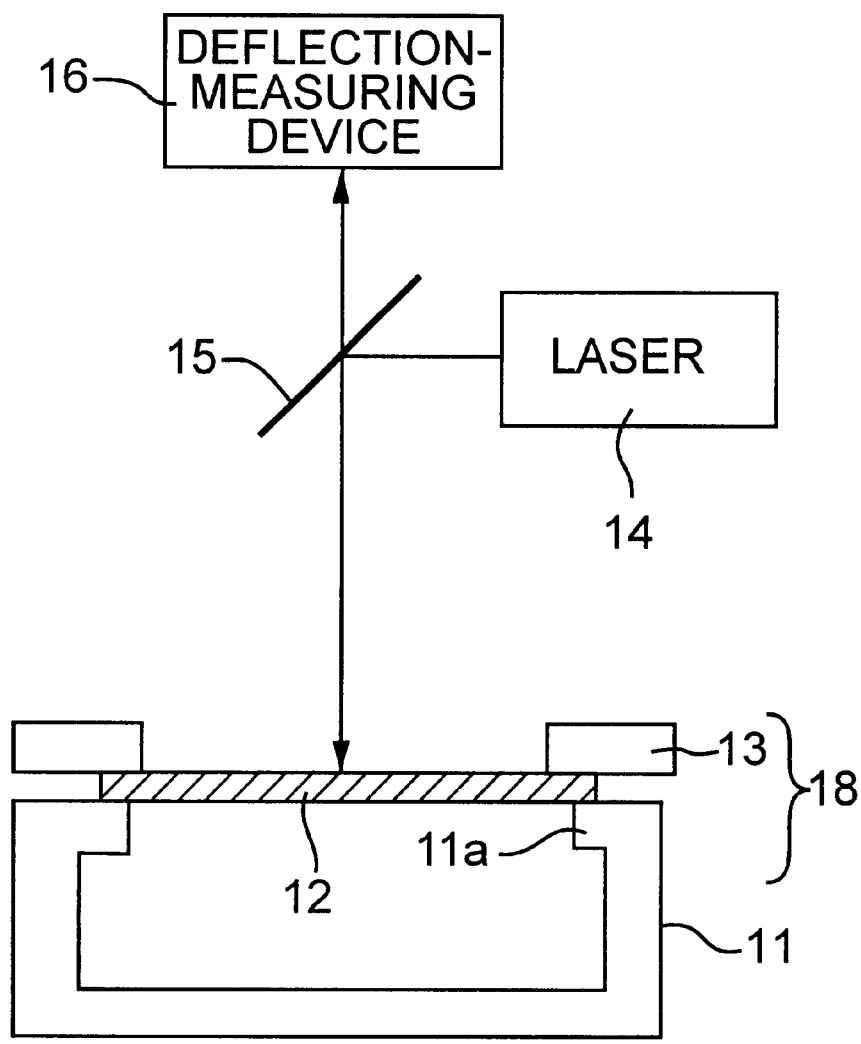
FIG. 10 is a simplified diagram of components of a conventional apparatus for evaluating a self-supporting thin film.
Figure 11A:
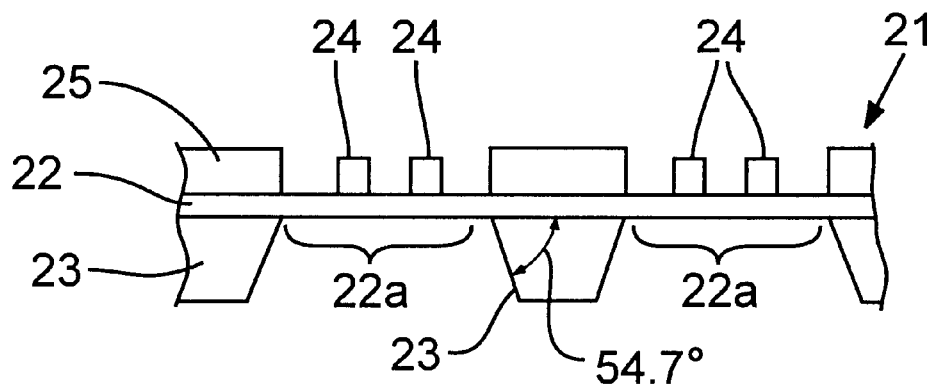
FIGS. 11(a)–11(b) are simplified diagrams of a scattering-transmission reticle and a scattering-stencil reticle, respectively, which exemplify reticles used in electron-beam microlithography.
Figure 11B:
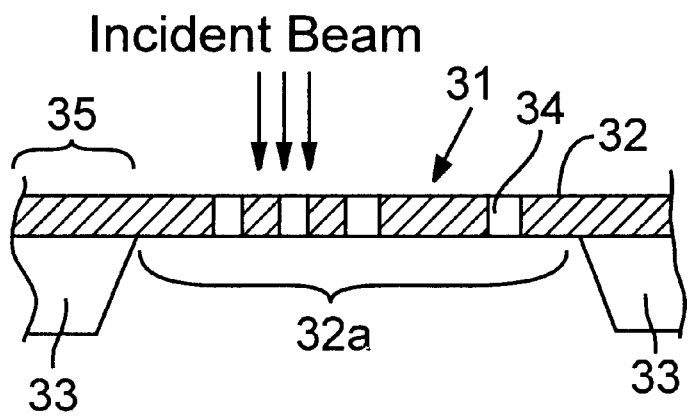

In contrast to the FIG. 10 apparatus, an apparatus 10 according to this embodiment includes a support mechanism 8 for the sample 2. The FIG. 1 apparatus also comprises an optical system including a He—Ne laser 4 and a beamsplitter 5, a pressure-adjustment chamber 1 defining an opening over which the sample 2 is placed. The sample-support mechanism 8 is placed on the sample 2 whenever the sample 2 is placed over the opening. The apparatus 10 also includes a pressure-adjustment and monitoring component 9 and a device 6 for measuring any deflection of the membrane of the sample 2. The device 6 can be any of various image-pickup devices such as a CCD.

The deflection-measuring device 6 is configured to determine the magnitude of deflection of the membrane 2a of the sample 2 in response to various pressures applied to the membrane 2a. Membrane deflection is obtained, for example, from a measurement of a respective change in the size of an image ("spot image" produced by laser light) reflected from the membrane 2a subjected to pressure versus the size of the spot image reflected from the membrane at atmospheric pressure. I.e., the membrane 2a is distended ("deflected") under the influence of various discrete applied pressures to the membrane, and the deflection is compared to behavior at atmospheric pressure. The pressure desirably is varied stepwise from atmospheric. The size of the spot image increases with increased deflection of the membrane (see FIG. 2(a)). Such a measurement system is termed a "reflected-image system."

In an alternative configuration, the pressure applied to the membrane 2a is varied stepwise from atmospheric. Interference fringes are generated by interference of light reflected from the membrane 2a with light reflected from a glass substrate 7. The light reflected from the glass substrate 7 serves as a reference light. The interference fringes are counted. From data concerning changes in the number of interference fringes, the magnitude of membrane deflection can be determined as a function of the various respective pressures applied to the membrane 2a (see FIG. 2(b)). This alternative configuration is termed herein an "interference system."

In the reflected-image system (FIG. 2(a)), substantially the entire respective membrane 2a in each subfield is irradiated individually with the laser light. In the interference system (FIG. 2(b)), only the central portion of the membrane 2a in each subfield is irradiated individually with laser light.

Figure 3:
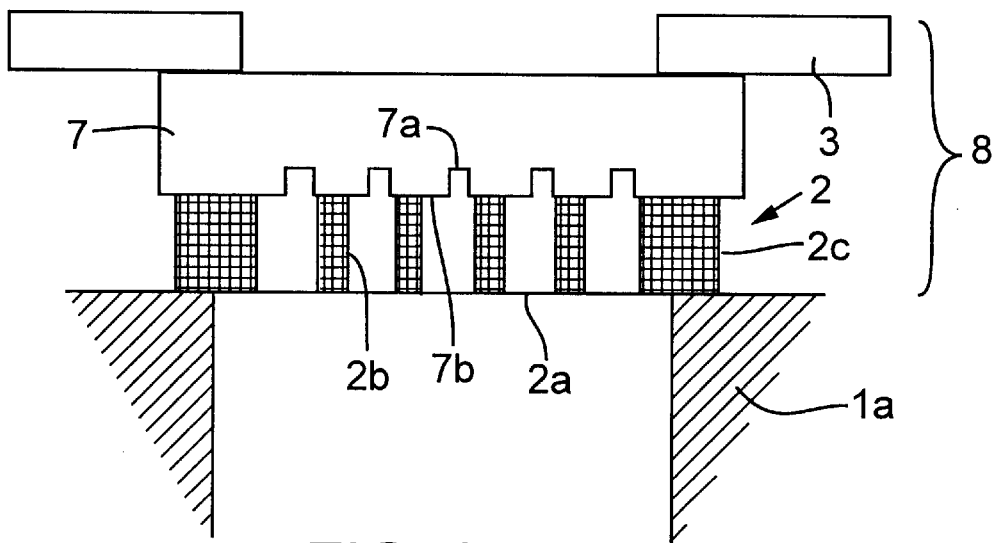
FIG. 3 is a detail view of the support mechanism used in the First Representative Embodiment.

FIG. 3 shows further detail of the support mechanism 8 of this embodiment as used to support a reticle blank as a representative sample. The support mechanism 8 is configured to allow the entire reticle blank 2 to be sandwiched between the open end 1a of the pressure-adjustment chamber 1 and a retainer 3 via the glass substrate 7 placed on the reticle blank 2. Specifically, the reticle blank 2 is placed at the open end 1a of the pressure-adjustment chamber 1 such that the peripheral frame 2c and support struts 2b of the reticle blank 2 extend upward away from the open end 1a. The glass substrate 7 defines channels 7a separating projecting portions 7b. The projecting portions 7b contact the struts 2b and peripheral frame 2c of the reticle blank 2 to affix the reticle blank 2 between the pressure-adjustment chamber 1 and the retainer 3.

The channels 7a also serve as air-release grooves allowing the space defined between the glass substrate 7, the struts 2b, the peripheral frame 2c, and the membrane 2a to be placed at atmospheric pressure as required.

Thus, the struts 2b and the peripheral frame 2c of the reticle blank 2 are securely fixed by the glass substrate 7 so that the membrane 2a of each subfield can be deflected upon application of pressure to the reticle blank 2.

Next, measurement of the magnitude of membrane deflection (and calculation of the respective internal stress and Young's modulus) are described using the evaluation apparatus according to this embodiment.

First, the reticle blank 2 is placed over and secured to the opening 1a in the pressure-adjustment chamber 1, as described above. Laser light emitted from the He—Ne laser 4 is reflected by the beamsplitter 5, passes through the glass substrate 7, and irradiates the respective membranes 2a in the various subfields of the reticle blank 2. A portion of the laser light irradiating a membrane 2a is reflected from the membrane, passes through the beamsplitter 5, and is incident on the deflection-measuring device 6. The magnitude of membrane deflection in response to stepwise changes in applied pressure is calculated from a corresponding change in the laser light (e.g., a change in the size of the reflected spot image or a change in the interference fringes) as incident on and detected by the deflection-measuring device 6.

The internal stress and Young's modulus are calculated according to Equation (1) using by a computer (not shown) as a function of the membrane thickness and the magnitude of membrane deflection exhibited per magnitude of pressure applied to the membrane.

The deflection of the respective membrane in each subfield can be measured by providing the pressure-adjustment chamber 1 with a mechanism for moving the reticle blank 2 relative to the pressure-adjustment chamber 1. Such movement is typically stepwise from one subfield to the next.

Second Representative Embodiment

Figure 4:
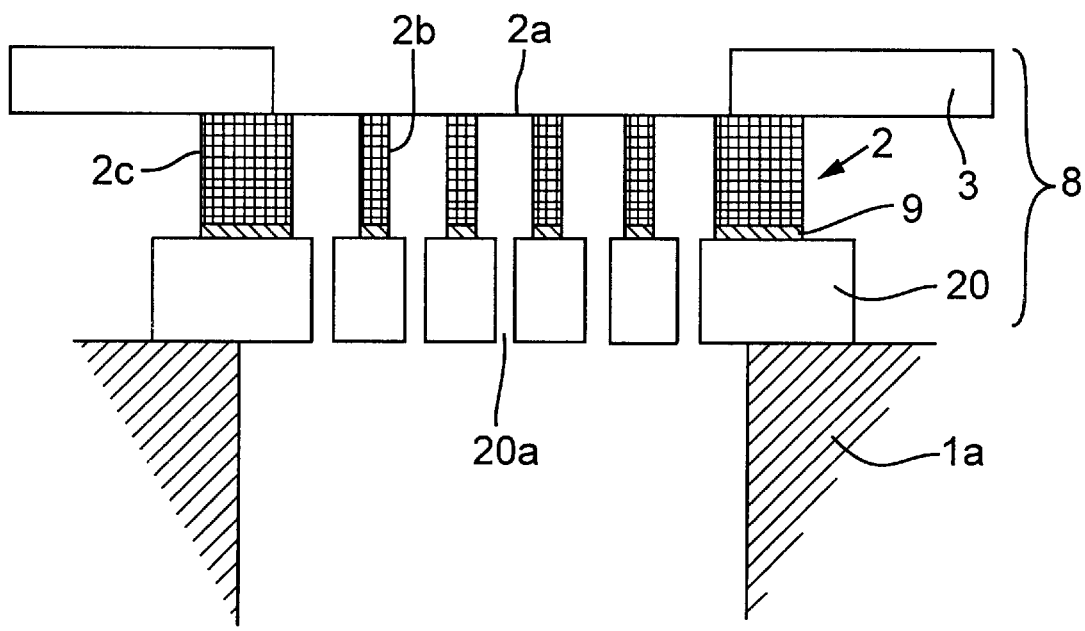
FIG. 4 is a detail view of the support mechanism of an apparatus for evaluating a self-supporting thin film, according to the Second Representative Embodiment.

An apparatus for evaluating a self-supporting thin film according to this embodiment is configured similarly to the First Representative Embodiment except for the manner in which the reticle blank 2 is supported over the opening 1a in the pressure-adjustment chamber 1. This embodiment is shown in FIG. 4 in which components that are the same as in the First Representative Embodiment have the same respective reference numerals.

In this embodiment, the support mechanism 8 for the reticle blank 2 utilizes a glass substrate 20 in which small through-holes 20a are defined. The through-holes 20a are arranged so as to coincide with the spacing of subfields on the reticle blank 2. The reticle blank 2 is placed superposedly on the glass substrate 20 such that the through-holes 20a are registered with the subfields. The reticle blank 2 and glass substrate 20 are thus sandwiched between the open end 1a of the pressure-adjustment chamber and the retainer 3. The through-holes 20a provide respective conduits to the respective subfields to allow the respective membrane portions 2a to be exposed to the pressure established in the pressure-adjustment chamber 1.

Meanwhile, since the struts 2b and peripheral frame 2c of the reticle blank 2 rest on the glass substrate 20, pressure applied to the glass substrate 20 is not transmitted directly to the struts 2b and peripheral frame 2c. Consequently, substantially no deformation of the struts 2b or peripheral frame 2c occurs with application of pressure to the reticle blank 2.

The substrate 20 need not be made of glass. Any of various other rigid substances can be used so long as the substrate 20 can be configured with the pattern of through-holes.

Measurement of membrane deflection (i.e., calculation of internal stress and Young's modulus) using an apparatus according to this embodiment is basically as described above for the First Representative Embodiment. However, if an interference system is used for measuring membrane deflection, a suitable reference surface is required. To such end, a second glass substrate (not shown) can be placed over the retainer 3. In any event, since the struts 2b and peripheral frame 2c of the reticle blank 2 are not deformed by application of pressure to the reticle blank, the respective membranes in the subfields of the reticle blank 2 can be evaluated accurately.

Third Representative Embodiment

Figure 5:
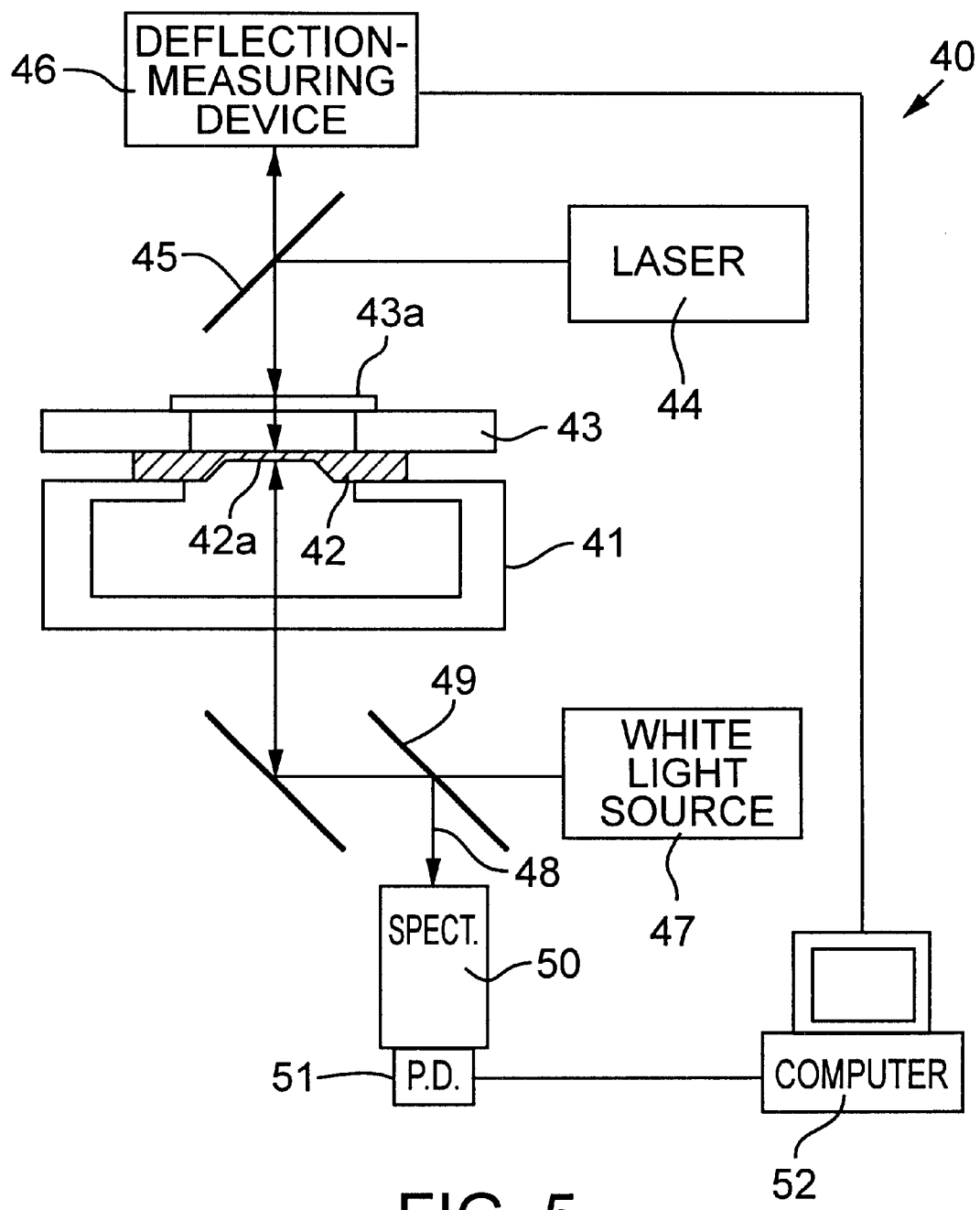
FIG. 5 is a simplified diagram of components of an apparatus for evaluating a self-supporting thin film, according to the Third Representative Embodiment.

An apparatus 40 according to this embodiment for evaluating a sample membrane is depicted in FIG. 5. The apparatus 40 comprises a pressure-adjustment chamber 41 that includes a sample-support mechanism 43 configured as a ring-shaped glass plate. The apparatus 40 also comprises a He—Ne laser 44, beamsplitters 45 and 49, a deflection-measuring device 46, a source 47 of white light, a spectrograph 50, a photodetector 51, and a computer 52. A glass substrate 43a is placed on the sample-support mechanism 43.

The pressure-adjustment chamber 41 is provided with a transmission window (not shown) for transmitting light that has passed through the membrane 42a of a sample 42.

The deflection-measuring device 46 generally is configured to count interference fringes produced by interference of light reflected from the membrane 42a with light reflected from the glass substrate 43a whenever the membrane 42a and the glass substrate 43a are irradiated with a monochromatic light.

The sample 42 can be, for example, a reticle blank manufactured according to a method as discussed in Japanese Kôkai (laid-open) Patent Document No. Hei 10-106943. Such a membrane has a thickness of 2 $\mu$m, has an area of 1-mm square per subfield, and is located in the center of a chip measuring 10-mm square cut from a 3-inch diameter silicon wafer. However, the sample 42 is not limited to such a specific example.

The sample 42 is placed over the opening defined by the pressure-adjustment chamber 41. The magnitude of membrane deflection is measured, relative to the pressure applied to the membrane, as follows. Light emitted from the He—Ne laser 44 ($\lambda$=632.8 nm) and reflected by the beamsplitter 45 successively irradiates the glass substrate 43a and the membrane 42a of the sample 42. Light reflected from the membrane 42a and light (serving as a reference light) reflected from the glass substrate 43a pass through the beamsplitter 45 and are incident on the deflection-measuring device 46.

The pressure applied to the membrane 42a desirably is varied stepwise. Meanwhile, interference fringes generated by interference of the light reflected from the membrane 42a with reference light reflected from the glass substrate 43a are counted. The magnitude of deflection in the membrane 42a as a function of applied pressure is calculated from the change in number of interference fringes. To such end, data regarding the change in number are routed to the computer 52, which performs the calculations.

To perform the calculations, the thickness of the membrane 42a must be determined. To such end, the pressure applied to the membrane 42a is set to atmospheric pressure, and the membrane 42a is irradiated with light emitted from the source 47 of white light. Light 48 reflected from the membrane 42a is reflected by the beamsplitter 49 and separated according to wavelength by the spectrograph 50. The respective intensities of the separated wavelengths of reflected light are sensed by the photodetector 51.

Data concerning the respective intensities of separated wavelengths of reflected light as sensed by the photodetector 51 are routed to the computer 52. A representative intensity spectrum as produced by the spectrograph 50 is shown in FIG. 6. The reflection spectrum reveals multiple peaks produced by interference of light reflected from the obverse surface of the membrane 42a with light reflected from the reverse surface of the membrane 42a.

If the wavelength of a first peak is denoted $\lambda_1$ and the wavelength of an adjacent second peak is denoted $\lambda_2$, the thickness of the membrane is denoted d, and $n_1$ and $n_2$ are the respective refractive indices at the wavelengths, then Equation (2) can be used to calculate the thickness of the membrane 2a:

$$d=\lambda_1\lambda_2/[2(\lambda_1 n_2-\lambda_2 n_1)] \qquad (2)$$

Specifically, if the peak wavelengths at two points in the reflection spectrum of a membrane are known, and the refractive index of the peak wavelength of the membrane is known, then the thickness of the membrane can be calculated using Equation (2).

The internal stress and Young's modulus of the membrane 2a are calculated by the computer 12 using Equation (1), based on the determined thickness of the membrane and the magnitude of membrane deflection that is detected as a function of pressure applied to the membrane.

Fourth Representative Embodiment

An apparatus 60 according to this embodiment is depicted in FIG. 7. The FIG. 7 embodiment has certain similarities to the FIG. 5 embodiment, but there are differences in general layout and arrangement. The FIG. 7 embodiment 60 comprises a pressure-adjustment chamber 61, a sample-support mechanism 63, a He—Ne laser 64, a first beamsplitter 65, a deflection-measuring device 66, a source 67 of white light 68, a second beamsplitter 69, a spectrograph 70, a photo-detector 71, and a computer 72.

In the FIG. 7 embodiment 60, the sample 62 is placed over an opening in the pressure-adjustment chamber 61. The magnitude of membrane deflection is measured in the same manner as in the FIG. 5 embodiment.

To measure the thickness of the membrane 62a, the pressure applied to the membrane 62a is set to atmospheric pressure. Meanwhile, the membrane 62a is irradiated with light 68 emitted from the source 67 of white light. After being transmitted through the membrane 62a, the white light 73 is separated by the spectrograph 70, and the intensity of the transmitted light is sensed by the photodetector 71. Data concerning the spectrum of transmitted light 73, as detected by the photodetector 71, are routed to the computer 72, and a transmission spectrum (e.g., as shown in FIG. 6) is produced. The thickness of the membrane 62a is calculated from the transmission spectrum using Equation (2).

Finally, the internal stress and Young's modulus of the membrane 2a are calculated as described above.

Fifth Representative Embodiment

Figure 8:
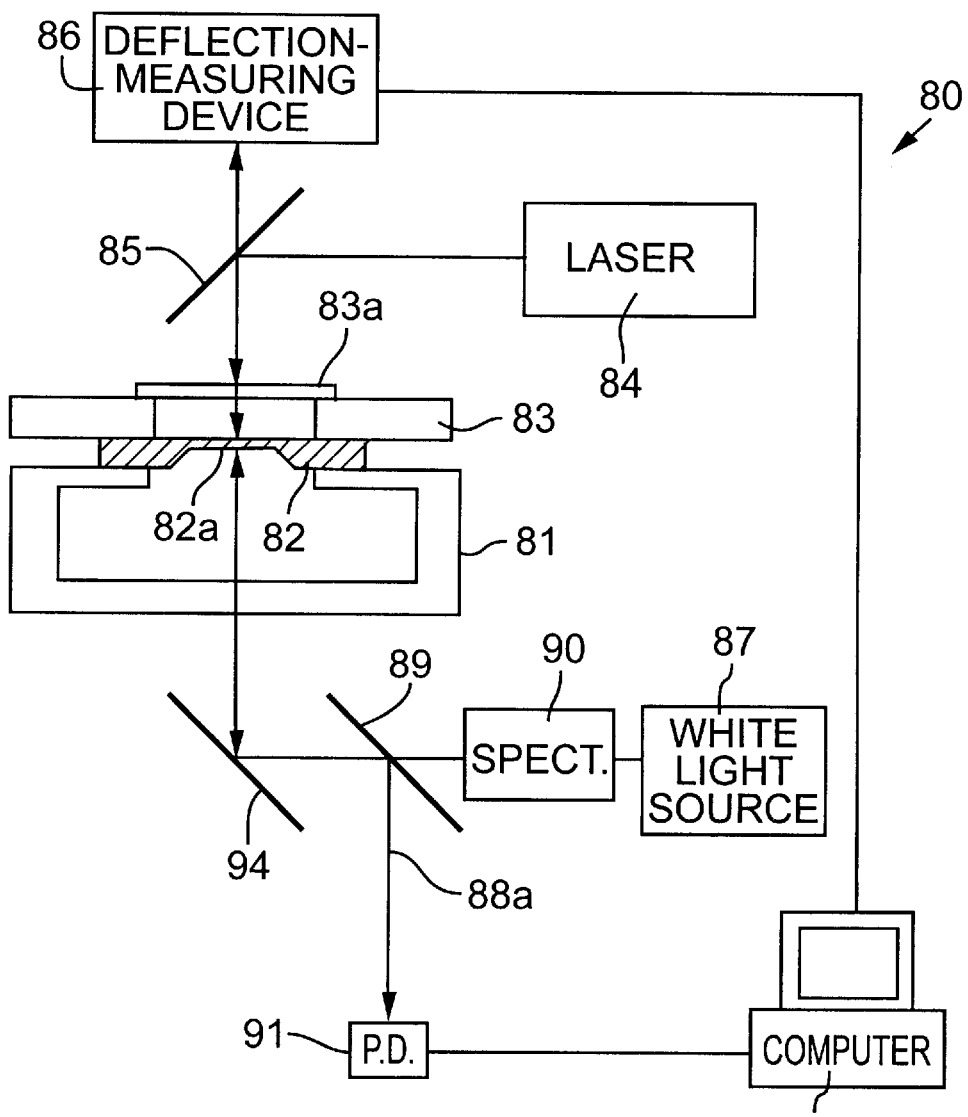
FIG. 8 is a simplified diagram of components of an apparatus for evaluating a self-supporting thin film, according to the Fifth Representative Embodiment.

An apparatus 80 according to this embodiment is shown in FIG. 8. This embodiment is similar to the Third Representative Embodiment except for the configuration of the spectrograph 90. I.e., in contrast to the Third Representative Embodiment, the spectrograph 90 in the FIG. 8 embodiment is situated in front of the source 87 of white light. The apparatus 80 also comprises a pressure-adjustment chamber 81, a sample-support mechanism 83, a He—Ne laser 84, a first beamsplitter 85, a deflection-measuring device 86, a second beamsplitter 89, a photodetector 91, a computer 92, and a mirror 94.

An atmospheric pressure is first applied to the membrane 82a while the membrane 82a is irradiated with monochromatic light output from the spectrograph 90. The spectrograph 90 produces the monochromatic light by separating the white light from the source 87 into individual component wavelengths of light.

Light 88a reflected from the membrane 82a is reflected by the second beamsplitter 89, and the intensity of the reflected light is sensed by the photodetector 91. The photodetector 91 produces data concerning the intensity of reflected light, and the data are routed to the computer 92.

Selected individual wavelengths of light directed to the membrane 82a are produced by the spectrograph 90. Measurements of light transmitted through the membrane 82a are made in the same manner as in the Fourth Representative Embodiment. A reflection spectrum such as shown in FIG. 6 is produced from the respective intensities of light at different wavelengths.

The thickness of the membrane 82a can be calculated from the reflection spectrum using Equation (2). Finally, the internal stress and Young's modulus of the membrane are calculated in the same manner as described in the Third Representative Embodiment.

Sixth Representative Embodiment

Figure 9:
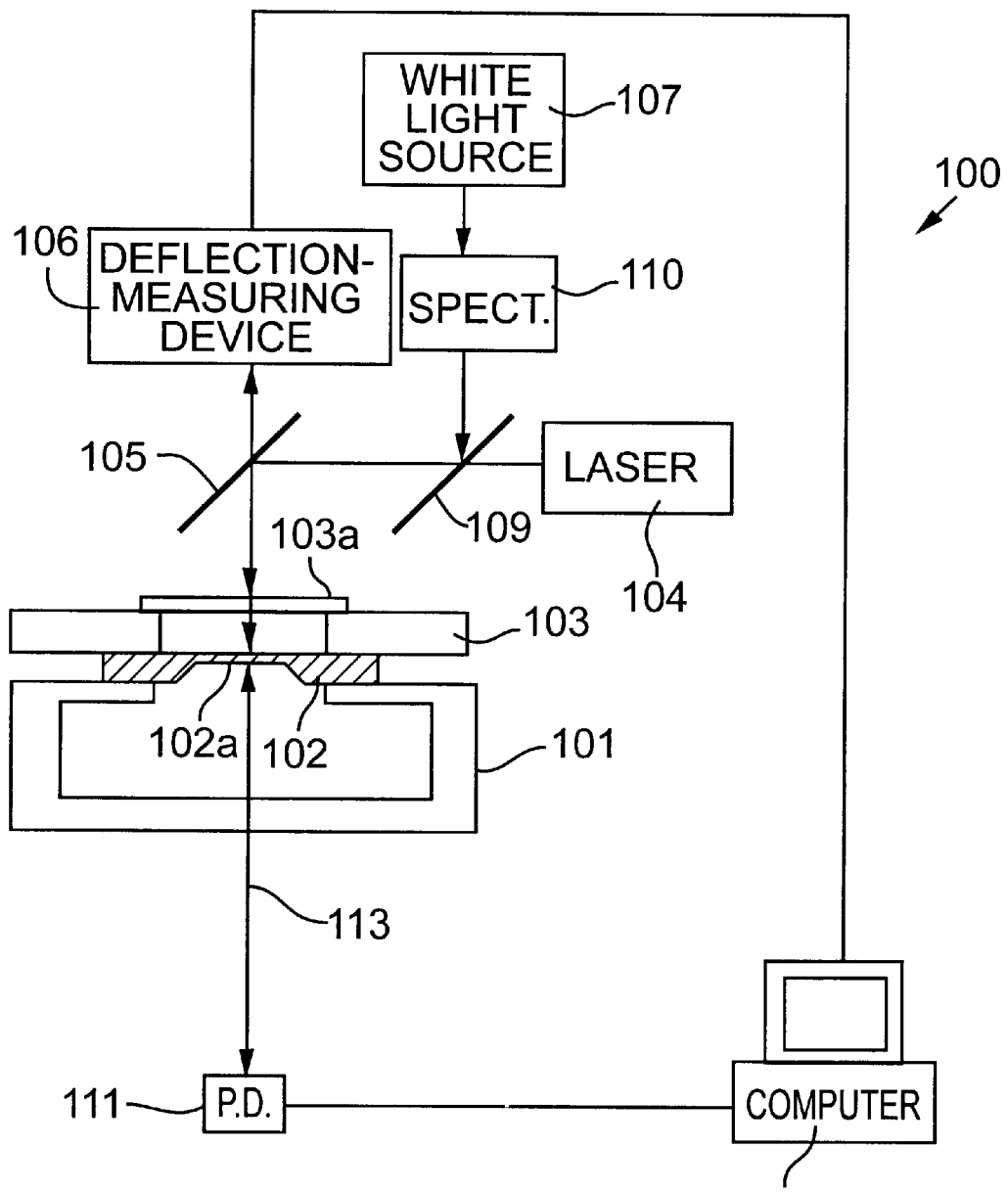
FIG. 9 is a simplified diagram of components of an apparatus for evaluating a self-supporting thin film, according to the Sixth Representative Embodiment.

An apparatus 100 according to this embodiment is depicted in FIG. 9. The apparatus 100 comprises a pressure-adjustment chamber 101, a sample-support mechanism 103, a He—Ne laser 104, a first beamsplitter 105, a deflection-measuring device 106, a source 107 of white light, a second beamsplitter 109, a spectrograph 110, a photodetector 111, and a computer 112.

This embodiment generally has the same configuration as the FIG. 7 embodiment except for the placement of the spectrograph 110. I.e., in the Sixth Representative Embodiment, the spectrograph 110 is disposed just downstream of the source 107 of white light.

The pressure applied to the membrane 102a is set first to atmospheric pressure as the membrane 102a is irradiated with monochromatic light. The monochromatic light is produced by the spectrograph 110 which separates the white light from the source 107 into individual respective wavelengths of light. The intensity of light 113a transmitted through the membrane 102a is sensed by the photodetector 111, and respective data is routed by the photodetector 111 to the computer 112.

The selected wavelength of light directed at the sample 102 can be varied using the spectrograph 110 while measurements of transmitted light 113a are made as described above.

The thickness of the membrane 102a can be calculated from the resulting reflection spectrum using Equation (2), and the internal stress and Young's modulus are calculated in the same manner as described above.

With any of the foregoing embodiments, after a measurement sample has been set in place, everything up to the calculation of internal stress and Young's modulus from the thickness of the membrane can be carried out in sequence. As a result, the internal stress and Young's modulus of a membrane can be determined accurately and in a short time.

Whereas the invention has been described in connection with multiple representative embodiments, it will be understood that the invention is not limited to those embodiments. On the contrary, the invention is intended to encompass all modifications, alternatives, and equivalents as may be included within the spirit and scope of the invention, as defined by the appended claims.

What is claimed is:

1. An apparatus for evaluating a sample comprising a self-supporting thin film and struts that divide the thin film into multiple subfields that are separated one from another and that include respective portions of the thin film, the apparatus comprising:

a sample-support mechanism;

a chamber defining an opening over which the sample, mounted with respect to the sample-support mechanism, is placed such that a pneumatic pressure established in the chamber is transmitted to a desired region on the thin film of the sample;

a deflection-measuring device situated and configured to measure an amount of deflection exhibited by the region on the thin film whenever the pressure is being applied from the chamber to the region; and an optical system situated and configured to irradiate the region on the thin film of the sample with light and to cause light reflected from the region to be incident on the deflection-measuring device;

wherein the sample-support mechanism comprises a substrate and a retainer, the substrate defining voids separated from each other by intervening projecting portions such that, whenever the sample is being supported by the sample-support mechanism, the voids are aligned with respective subfields and the projecting portions are aligned with respective struts so as to allow access of at least the desired region on the thin film to the pressure, and the retainer is configured to secure the sample and the substrate to the opening in the chamber in a manner in which the substrate and sample are sandwiched between the retainer and the chamber.

2. The apparatus of claim 1, wherein:

the sample is a reticle blank including a peripheral frame; and the retainer is further configured to align with the peripheral frame whenever the reticle is mounted to the chamber.

3. The apparatus of claim 1, wherein the optical system further comprises a laser and a mirror for directing light from the laser to the sample.

4. The apparatus of claim 1, wherein the deflection-measuring device is configured to measure a spread of light reflected from the thin film.

5. The apparatus of claim 1, wherein the deflection-measuring device is configured to measure an interference of a first light reflected from the thin film and a second light reflected from a reference surface.

6. An apparatus for evaluating a sample comprising a peripheral frame, struts, and a thin film extending between adjacent struts and between struts and the peripheral frame, the apparatus comprising:

a sample-support mechanism;

a chamber defining an opening over which the sample, mounted with respect to the sample-support mechanism, is placed such that a pneumatic pressure established in the chamber is transmitted to the thin film of the sample;

a deflection-measuring device situated and configured to measure an amount of deflection exhibited by the thin film whenever the pressure is being applied from the chamber to the sample; and a first optical system situated and configured to irradiate the thin film of the sample with light and to cause light reflected from the thin film to be incident on the deflection-measuring device;

wherein the sample-support mechanism comprises a substrate and a retainer, the substrate being configured to contact the peripheral frame and struts of the sample in a manner allowing access of the thin film to the pressure, and the retainer being configured to secure the sample and substrate to the opening in the chamber in a manner in which the substrate and sample are sandwiched between the retainer and the chamber, the substrate defining projecting portions arrayed relative to one another such that, whenever the sample is supported by the sample-support mechanism, the projecting portions are aligned with the struts of the sample so as to prevent deflection of the struts as pressure is being applied to the thin film.

7. The apparatus of claim 6, further comprising a second optical system situated and configured to irradiate the thin film so as to obtain a spectral characteristic of the thin film sufficient to determine a thickness of the thin film.

8. The apparatus of claim 6, wherein the first optical system further comprises a laser and a mirror for directing light from the laser to the sample.

9. The apparatus of claim 6, wherein the deflection-measuring device is configured to measure a spread of light reflected from the thin film and passing through the first optical system.

10. The apparatus of claim 6, wherein the deflection-measuring device is configured to measure an interference of a first light reflected from the thin film and a second light reflected from a reference surface.

11. An apparatus for evaluating a segmented reticle blank comprising intersecting struts defining individual reticle subfields each including a respective thin film, the apparatus comprising:

a sample-support mechanism;

a chamber defining an opening over which the reticle blank, mounted with respect to the sample-support mechanism, is placed such that a pneumatic pressure established in the chamber is transmitted to the thin films of the reticle subfields;

a deflection-measuring device situated and configured to measure an amount of deflection exhibited by the thin films whenever the pressure is being applied from the chamber to the reticle blank;

an optical system situated and configured to irradiate at least one of the thin films of the reticle blank with light and to cause light reflected from the irradiated thin films to be incident on the deflection-measuring device; and the sample-support mechanism comprising a substrate defining an array of holes or channels situated so as to individually register with respective subfields of the reticle blank, the substrate being configured to contact and support the peripheral frame and struts of the sample in a manner allowing access of the thin films to the pressure applied through the holes or channels while preventing deflection of the frame and struts, and a retainer configured to secure the sample and substrate to the opening in the chamber in a manner in which the substrate and sample are sandwiched between the retainer and the chamber.

12. The apparatus of claim 11, wherein the substrate is situated between the retainer and the opening whenever the reticle blank is mounted to the chamber.

13. The apparatus of claim 11, wherein the optical system further comprises a laser and a mirror for directing light from the laser to the reticle blank.

14. The apparatus of claim 11, wherein the deflection-measuring device is configured to measure a spread of light reflected from the thin film.

15. The apparatus of claim 11, wherein the deflection-measuring device is configured to measure an interference of a first light reflected from the thin film and a second light reflected from a reference surface.

16. An apparatus for evaluating a sample comprising a peripheral frame, struts, and a thin film extending between adjacent struts and between struts and the peripheral frame, the apparatus comprising:

a sample-support mechanism;

a chamber defining an opening over which the sample, mounted with respect to the sample-support mechanism, is placed such that a pneumatic pressure established in the chamber is transmitted to the thin film of the sample;

a deflection-measuring device situated and configured to measure an amount of deflection exhibited by the thin film whenever the pressure is being applied from the chamber to the sample; and an optical system situated and configured to irradiate the thin film of the sample with light to obtain a spectral characteristic of the thin film sufficient for a determination of a thickness of the thin film.

17. A method for evaluating a thin film of a sample comprising struts that divide the thin film into multiple subfields separated from one another by the struts, each subfield including a respective portion of the thin film, the method comprising:

(a) mounting the sample to a sample-support mechanism including a substrate configured to contact the sample in a manner allowing access of a desired region of the thin film to a pre-determined pressure, the substrate comprising an array of projection portions dimensioned and spaced from one another so as to contact and provide support for the struts of the sample mounted to the sample-support mechanism, the support preventing deflection of the struts whenever the pressure is being applied to the sample;

(b) applying the pre-determined pressure to the desired region of the thin film of the sample mounted to the sample-support mechanism;

(c) while performing step (b), irradiating the thin film with light; and (d) while performing step (c), measuring a characteristic of the light reflecting from the irradiated thin film.

18. The method of claim 17, wherein, in step (d), the characteristic provides data on one or both of Young's modulus and internal stress of the thin film.

19. The method of claim 17, wherein step (d) comprises measuring a respective change a spot image as reflected from the thin film as the thin film is being subjected to the pressure.

20. The method of claim 17, wherein step (d) comprises determining a number of interference fringes generated by interference of light reflected from the thin film and light reflected from a reference surface.

21. A method for evaluating a thin film of a sample, comprising:

(a) mounting the sample to a sample-support mechanism including a substrate configured to contact the sample in a manner allowing access of a desired region of the thin film to a pre-determined pressure;

(b) applying the pre-determined pressure to the desired region of the thin film;

(c) while performing step (b), irradiating the thin film with light;

(d) while performing step (c), measuring a characteristic of the light reflecting from the irradiated thin film; and (e) optically determining a thickness of the thin film, and using data concerning the determined thickness to determine the one or both of Young's modulus and internal stress of the membrane.

* * * * *

UNITED STATES PATENT AND TRADEMARK OFFICE
CERTIFICATE OF CORRECTION

PATENT NO. : 6,563,570 B1
DATED : May 13, 2003
INVENTOR(S) : Okada

It is certified that error appears in the above-identified patent and that said Letters Patent is hereby corrected as shown below:

Title page, Item [54] and Column 1, lines 1-3,
Title, "APPARATUS FOR EVALUATING A SAMPLE INCLUDING A SELF-SUPPORTING THIN FILM" should be -- APPARATUS AND METHODS FOR EVALUATING A THIN FILM OF A SAMPLE, INCLUDING A LATTICE OF STRUTS, WHILE PREVENTING DEFLECTION OF THE STRUTS --.

Column 2,
Line 31, "on the wafer) is" should be -- on the wafer is --.

Column 8,
Line 62, "$80_1$" should be -- $\lambda_1$ --.

Signed and Sealed this

Twenty-third Day of December, 2003

JAMES E. ROGAN
*Director of the United States Patent and Trademark Office*